United States Patent [19]

Krieger

[11] 3,961,598
[45] June 8, 1976

[54] GAS SAVING TACTILE DEVICE

[76] Inventor: LaVerne M. Krieger, 7718 Julie Drive, Kalamazoo, Mich. 49002

[22] Filed: Dec. 6, 1974

[21] Appl. No.: 530,059

[52] U.S. Cl. ............................ 116/114 AE; 180/77 R
[51] Int. Cl.² ........................................ G01D 13/00
[58] Field of Search ............................ 73/115, 116; 116/114 AE, DIG. 17, 138, 58 R, 67 R; 340/60, 136; 123/103 C, 103 E; 180/103, 77 R

[56] References Cited
UNITED STATES PATENTS

| | | | |
|---|---|---|---|
| 2,445,887 | 7/1948 | Palm | 116/67 R X |
| 2,661,713 | 12/1953 | Worel | 116/138 |
| 2,692,980 | 10/1954 | Platt | 340/60 X |
| 2,825,418 | 3/1958 | Kershman | 123/103 E X |

Primary Examiner—Jerry W. Myracle
Attorney, Agent, or Firm—Woodhams, Blanchard and Flynn

[57] ABSTRACT

A sensing device adapted for attachment to a vehicle engine and responsive to the vacuum created in the intake manifold for transmitting a tactile sensation to the driver to indicate when the vehicle is being driven in an uneconomical manner. The sensing device includes a sensor which is responsive to the vacuum in the intake manifold and, when the vacuum falls below a preselected minimum, causes actuation of a vibrator associated with the throttle linkage. The vibration is transmitted through the throttle linkage to the accelerator pedal, which vibration is felt by the driver. The vibration is terminated when the vacuum in the intake manifold exceeds the preselected minimum, under which condition more economical usage of fuel is achieved.

10 Claims, 5 Drawing Figures

GAS SAVING TACTILE DEVICE

FIELD OF THE INVENTION

This invention relates to a signalling system for a vehicle and, in particular, to a system which is capable of transmitting a tactile sensation to the vehicle driver to indicate when the vehicle is being driven in an uneconomical manner.

BACKGROUND OF THE INVENTION

Various devices have been devised to provide an indication or warning when a vehicle is being driven in an uneconomical manner. One of the most commonly utilized indicators involves the use of a vacuum gauge which is mounted on the instrument panel of a vehicle and is connected to the intake manifold of the engine so as to sense the vacuum which is developed therein. While such gauges do accurately measure the pressure (the vacuum) within the intake manifold, nevertheless such gauges do not provide sufficient indication to the driver so as to ensure that the vehicle is driven in the most economical manner. The prime disadvantage of vacuum gauges is that they require the driver to continuously look down at the gauge so as to visually inspect same, and this in turn requires that the driver's attention be distracted from the highway. In many situations, the driver's attention is directed to other matters and the warning indication which is registered on the vacuum gauge is accordingly not noticed by the driver.

To overcome the disadvantages associated with the use of a vacuum gauge, other types of warning devices have been mounted on a vehicle to indicate the uneconomical performance of the engine. One such device involves the use of a telescopic cylinder disposed within the throttle linkage, which cylinder collapses when the vacuum in the intake manifold falls below a predetermined magnitude. However, devices of this type are undesirable since they can result in the creation of a dangerous condition, particularly if the cylinder should collapse when the accelerator is being depressed in an effort to substantially increase the power output of the engine, such as when passing another vehicle.

Accordingly, it is an object of the present invention to provide an improved sensing system which can be mounted on a vehicle to indicate when the engine is being operated in an uneconomical manner, which sensing system overcomes the above-mentioned disadvantages. Particularly, it is an object of the present invention to provide an improved sensing system which involves a tactile sensor associated with the throttle linkage of a vehicle for imposing a tactile sensation on the driver of the vehicle, such as through the accelerator pedal, to indicate when the accelerator pedal is being depressed too rapidly.

It is also an object of the present invention to provide an improved system, as aforesaid, which automatically warns the driver when the engine is being operated in an uneconomical manner but which does not require visual observation on the part of the driver.

A further object is to provide a system, as aforesaid, which transmits a tactile sensation to the driver, as by imposing a vibration through the accelerator pedal onto the foot of the driver, whenever the vehicle is being driven in an uneconomical manner.

Still a further object is to provide a system, as aforesaid, wherein the sensor is responsive to the vacuum created in the intake manifold of the engine and, in particular, wherein the sensor incorporates a vibrator actuated by the pressure within the intake manifold.

A further object is to provide a system, as aforesaid, which is deactivated when the accelerator is depressed into a fully open throttle position so that the sensor does not detract from the power output of the engine during situations requiring full throttle, such as during passing and the like.

Another object is to provide a system, as aforesaid, which can be easily and economically installed on an existing vehicle, and which permits the driver of the vehicle to be warned in a relatively simple and nonirritating manner as to when the accelerator pedal is being depressed in a manner which results in an uneconomical usage of gas, whereby the driver can then take corrective action to result in more economical usage of fuel.

Other objects and purposes of the present invention will be apparent to persons acquainted with systems of this general type upon studying the following specification and drawings.

Figure 1:
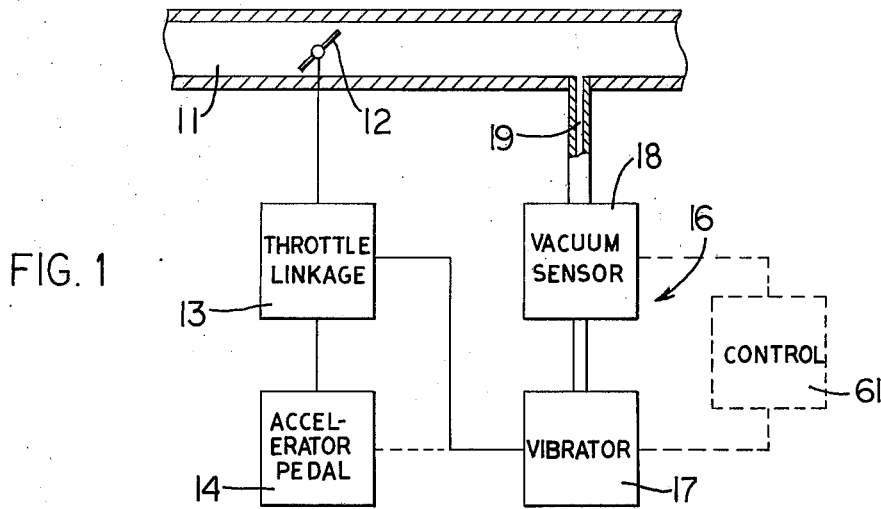
FIG. 1 is a diagrammatical illustration of a sensor system according to the present invention and its cooperation with the throttle linkage of a vehicle engine.

Certain terminology will be used in the following description for convenience in reference only and will not be limiting. For example, the words "rightwardly", "leftwardly", "upwardly" and "downwardly" will refer to directions in the drawings to which reference is made. The words "inwardly" and "outwardly" will refer to directions toward and away from, respectively, the geometric center of the system and designated parts thereof. Said terminology will include the words above specifically mentioned, derivatives thereof and words of similar import.

SUMMARY OF THE INVENTION

The objects and purposes of the present invention are met by providing a tactile-type sensor system adapted to be mounted on a vehicle engine in association with the throttle linkage for permitting a tactile-type warning to be transmitted to the driver whenever the vehicle is being driven in an uneconomical manner. The system includes a sensor which is responsive to the pressure, namely the vacuum, created in the intake manifold. The sensor controls a vibrator which can be mounted directly on the throttle linkage and, when actuated, imposes a vibration on the throttle linkage whenever the vacuum in the intake manifold falls below a preselected magnitude. When the accelerator pedal of the vehicle is depressed too rapidly, resulting in sudden opening of the throttle plate, the vacuum in the intake manifold undergoes a substantial decrease which is sensed by the sensor, which in turn activates the vibrator. The vibrator imposes a vibration on the throttle linkage which is transmitted to the accelerator pedal, which vibration is then felt by the driver of the vehicle. By easing up on the accelerator pedal, the throttle plate is partially closed and the vibration is thereby terminated. In a preferred embodiment of the invention, the vibrator includes a pneumatic-operated piston disposed in fluid communication with the intake manifold so as to be vibrated in direct response to the pressure of the gaseous mixture within the manifold.

DETAILED DESCRIPTION

FIG. 1 illustrates an intake manifold 11 as associated with an engine, such as an internal combustion engine as mounted on an automotive vehicle. The intake manifold has a movable throttle plate 12 associated therewith, which plate 12 is controlled in a conventional manner by a throttle linkage 13 which connects the plate 12 to an accelerator pedal 14 disposed within the passenger compartment of a vehicle.

In accordance with the present invention, there is provided a tactile-type warning system 16 for transmitting a signal to the driver when the vehicle is being driven in an uneconomical manner. The system 16 includes a vacuum sensor 18 which communicates with the intake manifold 11 by means of an intermediate conduit 19, which conduit 19 communicates with manifold at a location disposed downstream of the throttle plate 12. Vacuum sensor 18 in turn controls a vibrator 17 which is associated with the throttle linkage 13 so that, when vibrator 17 is actuated by the sensor 18, a vibration is transmitted through the linkage 13 onto the accelerator pedal 14, thereby imposing a tactile sensation in the form of a vibration on the foot of the driver.

Figure 2:
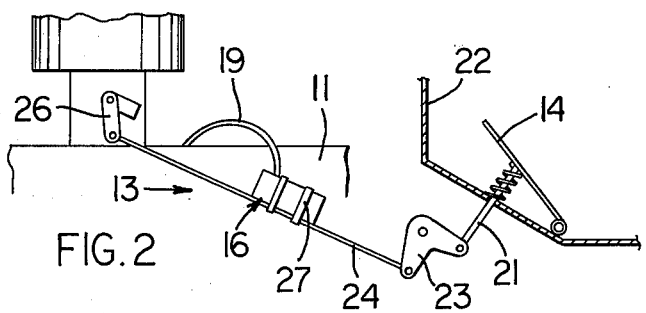
FIG. 2 illustrates a typical throttle linkage incorporating therein the sensor system of the present invention.

The throttle linkage 13 is conventional and, as illustrated in FIG. 2, includes a push rod 21 which is normally spring-urged upwardly into engagement with the accelerator pedal 14 to maintain the pedal in its uppermost or undepressed position. The push rod 21 extends through the floor board or firewall 22 of the vehicle, which wall 22 separates the passenger compartment from the engine compartment. The lower end of the push rod 21 is connected to an intermediate bell crank 23, which in turn is connected to an elongated connecting link 24, which has its forward end connected to a lever 26 associated with the throttle plate 12. The throttle linkage 13 is illustrated merely for purposes of convenience, but it will be recognized that the throttle linkage may take numerous other conventional configurations without departing from the present invention.

The warning system 16, in the illustrated embodiment, is mounted in direct association with the throttle linkage 13 and can be mounted directly on the connecting link 24, as by ring clamps 27. However, the warning system 16 may be connected directly to the accelerator pedal 14, particularly when rigid rod 24 is replaced by a flexible cable.

Figure 3:
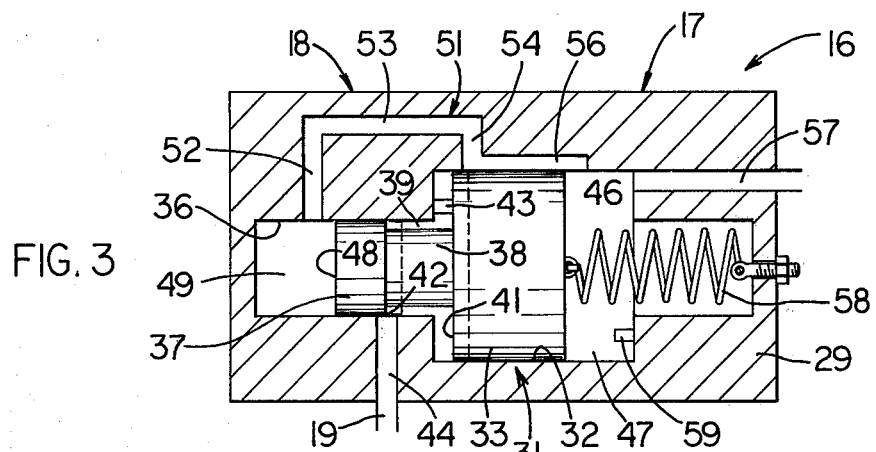
FIG. 3 is a cross-sectional view of a sensor according to the present invention as disposed in its inactive (i.e. high manifold vacuum) position.
Figure 4:
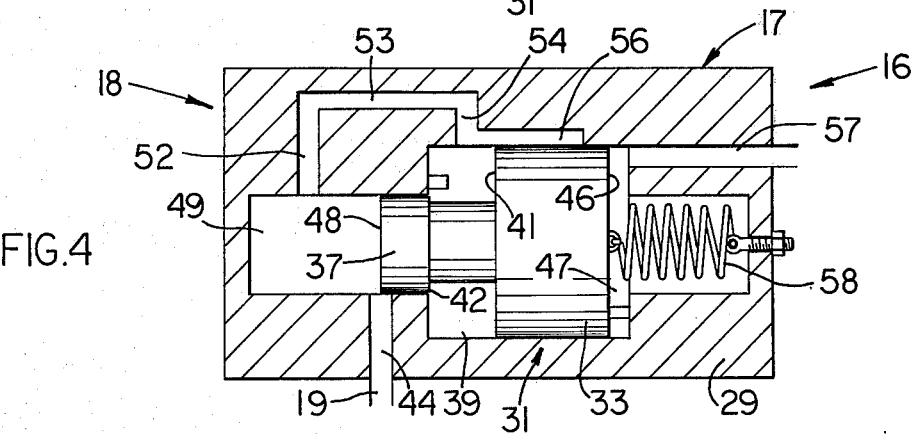
FIG. 4 is a cross-sectional view similar to FIG. 3 and illustrating the vibration mass displaced, such as occurs during vibration of the sensor.

The warning system 16, in a preferred embodiment, has the vibrator 17 and sensor 18 incorporated into a single unit as illustrated in FIGS. 3 and 4. This unit includes a housing 29 having a piston assembly 31 associated therein, which assembly 31 includes a primary bore 32 and a primary piston 33 slidably and sealingly supported within the bore 32. Piston assembly 31 also has a secondary bore 36 formed in the housing 29, and a secondary piston 37 is slidably and sealingly disposed within the bore 36. The bores 32 and 36 are coaxially aligned and in open communication with one another, and the secondary bore 36 and its associated piston 37 are of substantially smaller diameter than the primary bore 32 and its associated piston 33.

The primary and secondary pistons are rigidly interconnected by an intermediate cylindrical portion 38 which is of smaller diameter than the secondary piston 37. Intermediate portion 38 is spaced a substantial distance from the surrounding walls defining the bores 32 and 36, whereby an intermediate annular chamber 39 is formed between the pistons in surrounding relationship to the intermediate portion 38.

In the warning system 16 illustrated in FIGS. 3 and 4, the piston assembly 31 includes opposed inner end faces 41 and 42 formed on the pistons 33 and 37, respectively, which faces define the opposite ends of the intermediate chamber 39. The face 41 has an area which is substantially larger than the face 42. The face 41 is adapted to come into contact with a stop 43 which is fixed to the housing 29 and projects into the intermediate chamber 39. The intermediate chamber 39 normally communicates with a passage 44 as formed in the housing 29, which passage 44 is connected to the intermediate conduit 19. In fact, conduit 19 and passage 44 continuously communicate with the intermediate chamber 39 whenever the piston assembly 31 is in its inactive position (i.e. high manifold vacuum position) as illustrated in FIG. 3. When in this inactive position, the secondary piston 37 is disposed so that the inner end of the passage 44 is partially uncovered as illustrated in FIG. 3.

The primary piston 33 has an outer end face 46 formed thereon and coacting with the surrounding housing walls to define a primary end chamber 47 located adjacent one end (rightward end in FIGS. 3 and 4) of the piston assembly. The secondary piston 37 has a similar outer end face 48 which also coacts with the housing walls to define a secondary end chamber 49 which is disposed adjacent the opposite end of the piston assembly 31. Due to the difference in diameter of the pistons 33 and 37, the end face 46 is of substantially greater area than of the end face 48.

Housing 29 also has passage means 51 formed therein for providing controlled communication between the chambers 39, 47 and 49. For this purpose, passage means 51 includes a first passage 52 which continuously communicates with the secondary end chamber 49. First passage 52 communicates with a second passage 53 which extends longitudinally of the housing 29 and is connected to a third passage 54 which extends radially inwardly so as to communicate with the primary bore 32. The third passage 54 communicates with the bore 32 at a location disposed in the vicinity of the interface between the bores 32 and 36, whereby the third passage 54 is normally closed by the primary piston 33 whenever same is in its inactive position as illustrated in FIG. 3. However, when primary piston 33 is displaced from its normal inactive (i.e. high manifold vacuum) position into an activated (i.e. low manifold vacuum) position as illustrated in FIG. 4, then the inner end of the third passage 54 is disposed in open communication with the intermediate chamber 39.

The passage means 51 includes a fourth passage 56 which, in the illustrated embodiment, extends axially along and in open communication with the bore 32. The passage 56 extends from the inner end of passage 54 and projects toward the other end of the bore 32. Passage 56 is of sufficient length so that the end thereof (rightward end in FIG. 3) is in open communication with the primary end chamber 47 whenever the primary piston 33 is in its normal inactive position. However, as illustrated in FIG. 4, the passage 56 communicates with the bore 34 at a location which is spaced inwardly from the end thereof so that the passage 56 is closed and isolated from the primary end chamber 47 when the piston 33 is in its activated position.

Housing 29 is provided with a further passage 57 which is in continuous communication with the primary end chamber 47. Passage 57 is in continuous communication with the surrounding atmosphere. A conventional tension spring 58 is disposed within the housing and has one end adjustably anchored to the housing and the other end anchored to the piston assembly 31, whereby the tension spring 58 normally imposes a force on the piston assembly 31 tending to urge same towards its active position (rightwardly in FIGS. 3 and 4). The housing 29 also has a further stop 59 associated therewith, which stop is disposed within the primary end chamber 47 for limiting the advancing movement (rightward movement in the drawing) of the piston assembly during the vibration or oscillation thereof.

OPERATION

The operation of the system according to the present invention will be briefly described to ensure a complete understanding thereof.

During operation of a vehicle engine, and particularly during an idling condition, the throttle plate 12 of the engine is in a substantially closed orientation so that the pressure within the intake manifold 11 downstream of the throttle plate 12 is at a level which is substantially below atmospheric. This reduced pressure level within the intake manifold 11 is normally measured relative to atmospheric pressure and is thus normally referred to as a vacuum. Under idling conditions, this vacuum within the intake manifold is normally in the neighborhood between 17 and 20 inches of mercury as measured relative to atmospheric pressure. However, during operation of the vehicle, the throttle is partially opened and the maximum fuel economy normally occurs when the vacuum in the intake manifold is within the range of approximately 10 to 13 inches of mercury. However, when the accelerator pedal is additionally depressed, this causes a substantial opening of the throttle plate. This accordingly results in additional flow of air into the intake manifold so that a substantial decrease occurs in the vacuum within the intake manifold. Under this situation, the vacuum in the intake manifold may decrease to a pressure level which is less than 8 inches of mercury and, in fact, the vacuum will decrease to substantially zero when the throttle plate is fully open.

Figure 5:
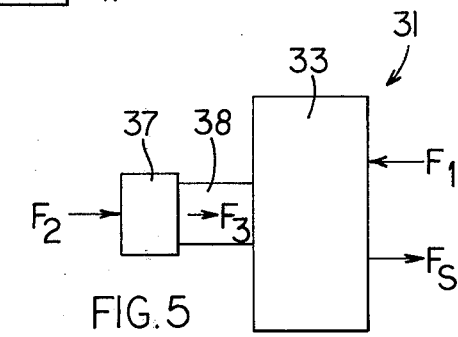
FIG. 5 diagrammatically illustrates the forces as applied to the piston of the vibrator.

Considering now the operation of the warning system 16 during vehicle operation, reference is made particularly to the structure illustrated in FIGS. 3–5. When the engine is operating under normal economical conditions, the vacuum in the intake manifold 11 exceeds a preselected minimum, such as 8 inches of mercury for example. Thus, during idling or under normal vehicle operations, the vacuum in intake manifold 11 exceeds this minimum and accordingly the warning system 16 remains in an inactive position substantially as illustrated in FIG. 3.

When the sensor 16 is in the inactive position illustrated in FIG. 3, atmospheric pressure exists within the primary end chamber 47 due to the communication with the atmosphere via the passage 57. This atmospheric pressure, when multiplied by the area of the end face 46, results in imposition of a pressure force $F_1$ acting leftwardly on the piston assembly 31 as illustrated in FIG. 5. The tension spring 58 also imposes a force $F_s$ on the piston, which force acts rightwardly on the piston but is of substantially less magnitude than the force $F_1$. The atmospheric pressure in primary end chamber 47 also flows through passage means 51 so that secondary end chamber 49 is also subjected to atmospheric pressure which, when multiplied by the area of the end face 48, results in a force $F_2$ acting rightwardly on the piston assembly 31 as illustrated in FIG. 5. This force $F_2$ is obviously substantially less than the force $F_1$ in view of the substantial difference in the areas of the faces 46 and 48. A further pressure force $F_3$ acts on the piston assembly 31, which force $F_3$ is developed by the gaseous mixture contained in the intermediate chamber 39. Since chamber 39 communicates via conduit 19 with intake manifold 12, the intermediate chamber 39 is thus subjected to the same vacuum as exists in the intake manifold. This reduced pressure in the chamber 39 thus results in the force $F_3$ acting rightwardly on the piston assembly 31, which force $F_3$ is obtained by multiplying the pressure of the air in the chamber 39 by the difference in the area defined by the faces 41 and 42. When the vacuum in the manifold 11 exceeds the predetermined minimum (such as 8 inches of vacuum), the sum of the forces $F_2$, $F_3$ and $F_s$ is less than the force $F_1$, so that the force $F_1$ maintains the piston assembly in its leftwardmost position as illustrated in FIG. 3, whereupon the piston assembly abuts against the stop 43.

When the throttle plate 12 is opened an additional amount, such as by a further depression of the accelerator pedal 14, this results in an additional decrease in the vacuum within the intake manifold. If the vacuum in the intake manifold drops below this preselected minimum (for example, below 8 inches), this results in the absolute pressure as measured within the intake manifold and within the annular chamber 39 increasing so that the force $F_3$ likewise increases. The combined rightwardly acting force created by $F_2$, $F_3$, and $F_s$ thus slightly exceeds the leftwardly acting force $F_1$ so that the piston assembly 31 is moved slightly away (rightwardly in FIG. 3) from the stop 43. When the piston is moved through a small distance so as to assume the position indicated by dotted lines in FIG. 3, this results in the secondary piston 37 closing the passage 44, and substantially simultaneously therewith, the piston 33 uncovers the inner end of the passage 54 so that the intermediate chamber 39 effectively communicates with the passage 56 and is subjected to the atmospheric pressure which exists in the primary end chamber 47. This flow of atmospheric pressure into the intermediate chamber 39 results in a substantial increase in the magnitude of the pressure within this chamber, which in turn results in a substantial increase in the magnitude of the force $F_3$. The combined rightwardly acting force, namely a combination of $F_2$, $F_3$ and $F_s$, thus suddenly exceeds $F_1$ by a substantial amount so that piston assembly 31 is rapidly moved rightwardly into the position illustrated in FIG. 4, whereupon the primary piston 33 impacts against the stop 59. This impact is then transmitted through the throttle linkage onto the accelerated pedal and is thereby sensed by the foot of the driver.

When the piston assembly 31 is being moved into the position illustrated in FIG. 4, the advancing movement of the primary piston 33 effectively closes off the forward end of the passage 56 so that the chambers 39 and 49 are thus each isolated from the atmospheric pressure which exists in the primary end chamber 47. At the same time, the secondary piston 37 again uncovers the passage 44 so that the secondary end chamber 49 thus communicates with the intake manifold 11 via the conduit 19. Intermediate chamber 39 also communicates with the secondary chamber via the passages 52, 53 and 54. Since a vacuum still exists within the manifold 11, which vacuum is still presumably below the preselected minimum (for example 8 inches), the air within the chambers 37 and 39 will thus be partially drawn through the conduit 19 and sucked into the manifold 11, whereby the chambers 39 and 49 will thus be subjected to a partial vacuum. This will thus result in a substantial decrease in the forces $F_2$ and $F_3$ developed in the chambers 49 and 39, respectively. At the same time, the force $F_s$ imposed by the spring 58 is also substantially reduced due to the contraction of the spring. The total of the forces $F_2$, $F_3$ and $F_s$ is thus substantially less than the leftwardly acting force $F_1$ created by the atmospheric pressure in the chamber 47, so that the force $F_1$ thus rapidly returns the piston assembly 31 leftwardly towards its original position and causes the piston assembly to impact against the stop 43 upon reaching its original position as illustrated in FIG. 3.

If the vacuum within the intake manifold is still below the preselected minimum, then the piston assembly 31 will continue to reciprocate back and forth within the housing 29, with the piston assembly alternately impacting against the stops 43 and 59, which impacts are transmitted through the linkage and impose a vibration on the foot of the driver. However, when the vacuum in the intake manifold again exceeds the preselected minimum, then the piston assembly will automatically return to and remain within the position illustrated in FIG. 3.

In carrying out the present invention, and specifically when utilizing a fluid-pressure type vibrator as illustrated in FIGS. 3 and 4, the initiation of vibration of the piston assembly 31 will be selected for each particular engine according to a vacuum level in the intake manifold which is considered to be the minimum magnitude necessary to result in economical performance. When this minimum desired vacuum has been determined, then the difference in area between the pistons 33 and 37 can likewise be determined so as to permit proper reciprocation of the pistons when the intake manifold vacuum falls below the preselected minimum. Alternately, the force characteristics of spring 58 can be selected as necessary to provide the desired mode of operation.

In the present invention, when the throttle is moved to a fully opened position, the vacuum in the manifold approaches zero so that the manifold thus experiences substantially atmospheric pressure therein. Under this situation, a substantial balance of pressure exists across the piston assembly 31 inasmuch as substantially atmospheric pressure exists in all of the chambers 39, 47 and 49. The spring 58 will thus cause the piston assembly 31 to be moved into and maintained in the position illustrated in FIG. 4. The vibration under this wide open throttle condition will thus cease so that same will not distract the driver. When in the position illustrated in FIG. 4, the atmospheric passageway 57 is effectively isolated from the conduit 19 so that this prevents further air from being drawn into the intake manifold through the warning system 16, whereupon this permits a slightly richer mixture to be sent into the cylinders, whereby the engine can thereby develop maximum power in accordance with the usual design requirments when the throttle is in a wide or fully open position.

A further desirable advantage which results from the warning system 16, when same is vibrating, results from the fact that some of the atmospheric air is periodically transmitted into the chambers 39 and 49, which atmospheric air is then drawn through the conduit 19 into the intake manifold 11. This additional air under uneconomical driving conditions, results in further deletion of the rich mixture which is being supplied to the engine.

While the warning system 16 desirably incorporates therein a fluid pressure piston unit of the type illustrated in FIGS. 3 and 4, particularly since same can be connected to and operated directly by the intake manifold, nevertheless the warning system 16 of the present invention may also assume other forms.

For example, the vibrator 17 may comprise an electrical motor having an eccentric or unbalanced weight mounted thereon for creating a vibrating force during rotation of the motor, which motor can be pivotally mounted on the throttle linkage so as to impact back and forth between a pair of stops. In this instance, the motor would be controlled by means of a suitable control 61 as illustrated by dotted lines in FIG. 1, which control may comprise a conventional electric switch, which switch in turn would be controlled by a vacuum sensor, such as by the vacuum sensor 18, which sensor may take the form of a diaphragm.

As a further possible modification, the vibrator may comprise an electric solenoid mounted on the throttle linkage and having a movable plunger designed to impact against suitable stops, with the solenoid being energized and de-energized by means of a vacuum-controlled electric switch, which switch would be responsive to the vacuum in the intake manifold.

While the frequency of vibration as imposed on the accelerator pedal may vary substantially, nevertheless it has been determined that a vibration in the range approximately 10 to 15 cycles per second is most acceptable to the driver.

The present invention thus relates to a system which can be easily mounted on an existing engine or incorporated into a new engine during manufacture thereof. The device provides a tactile sensation which is not distracting to the driver but gives the driver adequate warning that he is not driving under conditions which result in the most economical usage of fuel. If the driver heeds this warning, as by easing up on the accelerator pedal, the vibration will thus cease and the driver will again be driving under economical conditions.

In the case of a multi-engine vehicle or an engine operating in a noisy environment, the device could serve to warn the operator of an inoperative engine and at the same time tell which engine is inoperative. This is very critical in the operation of multi-engine aircraft.

Although a particular preferred embodiment of the invention has been disclosed in detail for illustrative purposes, it will be recognized that variations or modifications of the disclosed apparatus, including the rearrangment of parts, lie within the scope of the present invention.

The embodiments of the invention in which an exclusive property or privilege is claimed are defined as follows:

1. In a vehicle having an internal combustion engine, an intake manifold means associated with said engine for supplying a fuel-air mixture thereto, and operator engaging means disposed within the passenger compartment of the vehicle and adapted to be engaged by the operator of the vehicle, the improvement comprising:

a tactile-type warning system coacting with said engine for warning the operator when the engine is being operated in an uneconomical manner by imposing a tactile vibration on the operator, said warning system including vibrator means for generating a tactile vibration when an uneconomical operational condition exists, vibration transmitting means connected between said vibrator means and said operator engaging means for transmitting said tactile vibration to said operator to signal said uneconomical operational condition, and activating means coacting between said manifold means and said vibrator means for activating said vibrator means whenever the vacuum in said intake manifold means is less than a predetermined magnitude.

2. In a vehicle having an internal combustion engine, intake manifold means associated with said engine for supplying a fuel-air mixture thereto, a movable throttle plate associated with said manifold means, and a throttle linkage interconnected to said throttle plate for controlling the position thereof, said throttle linkage including a manually movable control member adapted to be engaged and moved by the operator of the vehicle, the improvement comprising:

a tactile-type warning system coacting with said engine for warning the operator when the engine is being operated in an uneconomical manner, said warning system including vibrator means for transmitting a vibration to said operator when an uneconomical operational condition exists, said vibrator means being connected to said throttle linkage for transmitting a vibration onto said control member, and activating means coacting between said manifold means and said vibrator means for activating said vibrator means whenever the vacuum in said intake manifold means is less than a predetermined magnitude.

3. A vehicle according to claim 2 wherein said activating means includes a shiftable member which is exposed to the pressure within said intake manifold means and is moved in response to changes in said pressure.

4. In a vehicle having an internal combustion engine, intake manifold means associated with said engine for supplying a fuel-air mixture thereto, a movable throttle plate associated with said manifold means, and a throttle linkage interconnected to said throttle plate for controlling the position thereof, said throttle linkage including a manually movable control member adapted to be engaged and moved by the operator of the vehicle, the improvement comprising:

a tactile-type warning system coacting with said engine for warning the operator when the engine is being operated in an uneconomical manner, said warning system including vibrator means for transmitting a vibration to said operator when an uneconomical operational condition exists, said vibrator means including a housing having a piston slidably disposed therein, first conduit means providing communication between said intake manifold means and one side of said piston, second conduit means providing communication between the atmosphere and the other side of said piston, and activating means coacting between said manifold means and said vibrator means for activating said vibrator means whenever the vacuum in said intake manifold means is less than a predetermined magnitude.

5. A vehicle according to claim 4, wherein said activating means includes a second piston connected to said first mentioned piston for movement therewith, said second piston being of substantially smaller diameter than said first-mentioned piston and controlling the opening and closing of said first conduit means.

6. A vehicle according to claim 5, wherein said first mentioned and second pistons are coaxially aligned and fixedly interconnected, said first mentioned and second pistons coacting with the housing to define therebetween an intermediate annular chamber, and said first mentioned and second pistons coacting with said housing to define first and second end chambers located adjacent the opposite ends of said first mentioned and second pistons, respectively, first passage means adapted for communication with said first end chamber, second passage means in continuous communication with said second end chamber, and third passage means connected between said first and second passage means and adapted for communication with said intermediate chamber, and said second piston causing said first conduit means to alternately communicate with said intermediate chamber and said second end chamber as said first mentioned and second pistons reciprocate back and forth.

7. A tactile warning device adapted for attachment to a vehicle engine for warning the vehicle operator when the engine is operating in an uneconomical manner, comprising:

vibrator means adapted for attachment to the throttle linkage of a vehicle for imposing a vibration thereon which can be sensed by the foot of the operator when same is disposed in engagement with the accelerator pedal of the vehicle; and activating means connected to said vibrator means for activating said vibrator means whenever the vacuum within the intake manifold of the engine drops below a predetermined minimum, said activating means including means for sensing the pressure within the intake manifold of the engine.

8. A device according to claim 7, wherein said activating means includes conduit means adapted for connection to the intake manifold at a location disposed downstream of the throttle plate, said activating means also including a movable member disposed in communication with said conduit means and movable in response to the pressure of the gaseous mixture contained in said manifold.

9. A device according to claim 8, wherein said vibrator means includes a housing defining a bore therein and a fluid-actuated piston slidably disposed within said housing and being movable back and forth for creating a vibratory impact which can be transmitted through the throttle linkage onto the accelerator pedal.

10. A device according to claim 9, wherein said movable member and said piston are fixedly interconnected and are each slidably disposed within said housing, said movable member constituting a second piston which is slidable and sealingly disposed within said housing and has a diameter which is substantially less than the diameter of said first-mentioned piston, and said second piston controlling the opening and closing of said conduit means, and passage means communicating with the chamber defined adjacent at least one side of said first-mentioned piston for normally maintaining said first-mentioned piston in a stationary condition.

\* \* \* \* \*